C. D. COMPTON.
COMBINATION RIGID AND FLEXIBLE FRAME FOR MOTOR CYCLES.
APPLICATION FILED MAR. 18, 1915.
1,173,770.
Patented Feb. 29, 1916.
2 SHEETS—SHEET 1.
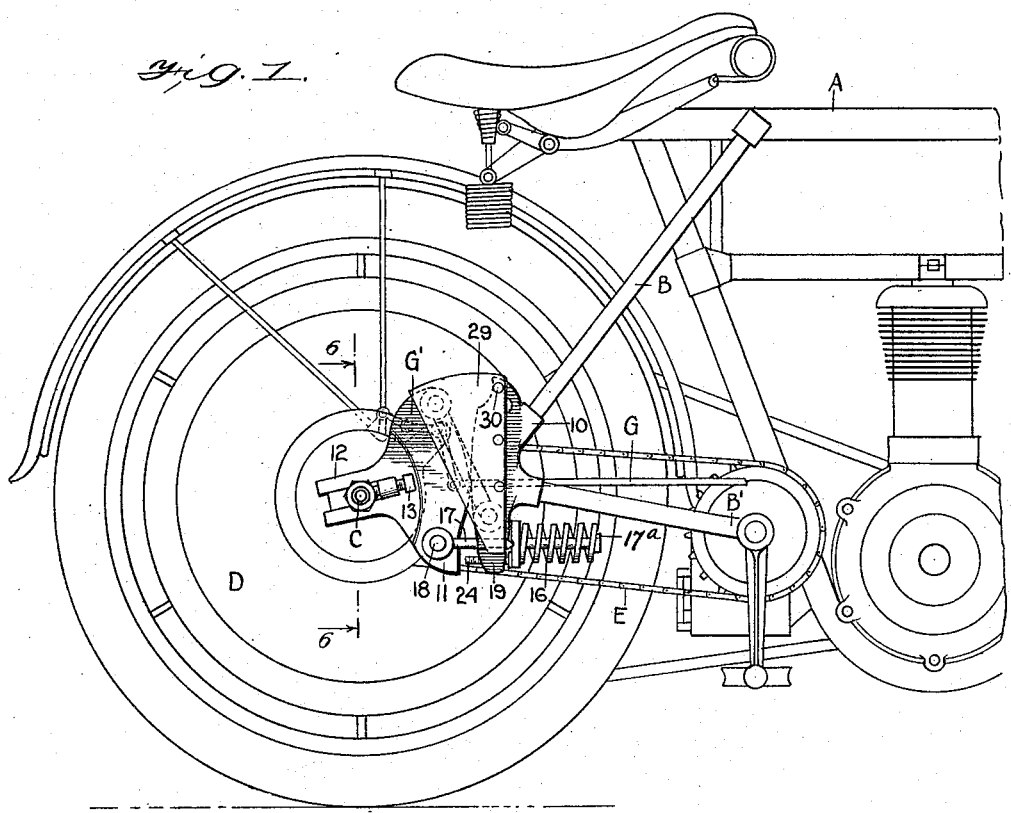
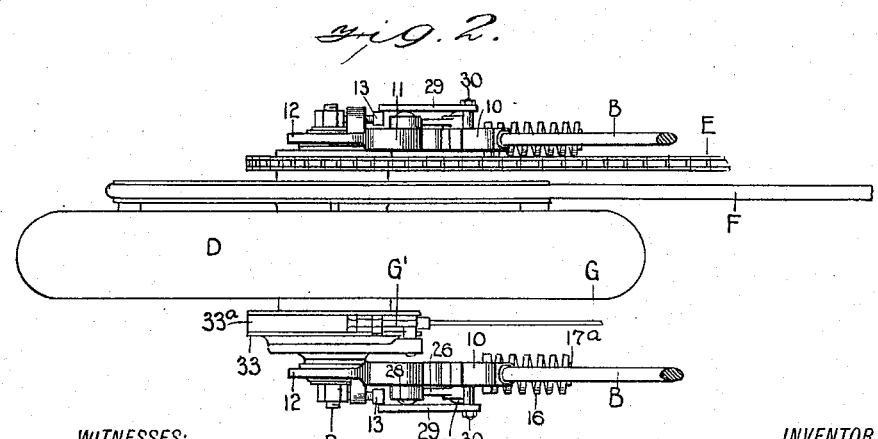
WITNESSES:
INVENTOR
Clarence D. Compton
BY
ATTORNEYS C. D. COMPTON.
COMBINATION RIGID AND FLEXIBLE FRAME FOR MOTOR CYCLES.
APPLICATION FILED MAR. 18, 1915.
1,173,770.
Patented Feb. 29, 1916.
2 SHEETS—SHEET 2.
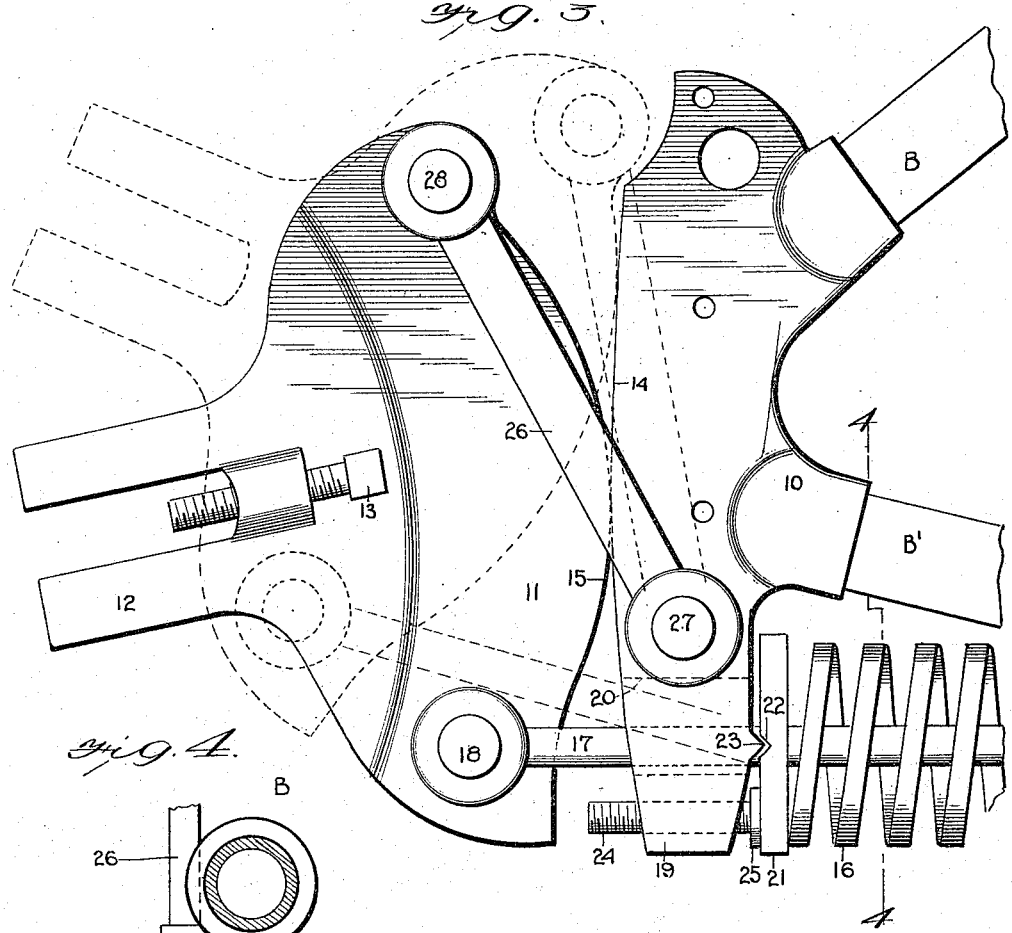
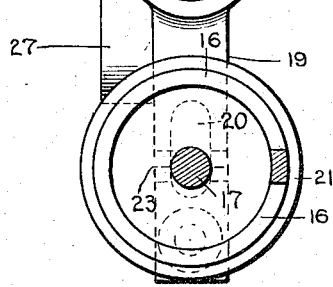
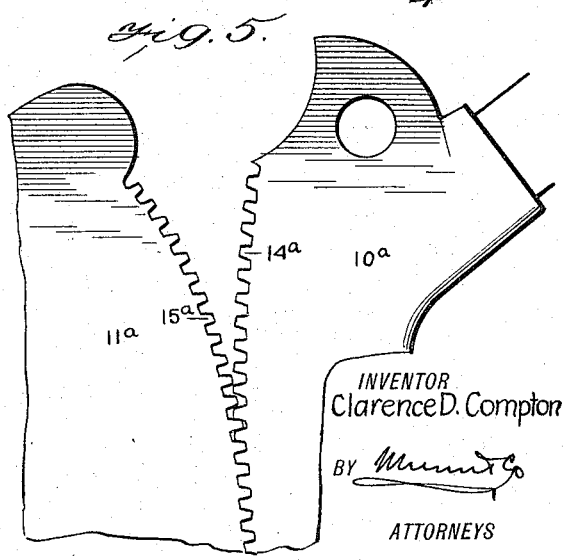
WITNESSES:
INVENTOR
Clarence D. Compton
BY
ATTORNEYS

UNITED STATES PATENT OFFICE.

CLARENCE D. COMPTON, OF NEW YORK, N. Y.

COMBINATION RIGID AND FLEXIBLE FRAME FOR MOTOR-CYCLES.

1,173,770.  Specification of Letters Patent.  Patented Feb. 29, 1916.

Application filed March 18, 1915. Serial No. 15,168.

*To all whom it may concern:*

Be it known that I, CLARENCE D. COMPTON, a citizen of the United States, and a resident of the city of New York, borough of Manhattan, in the county of New York and State of New York, have invented a new and Improved Combination Rigid and Flexible Frame for Motor-Cycles, of which the following is a full, clear, and exact description.

My invention relates to means for resiliently supporting the rear fork of a motor cycle, or other form of velocipede, to yield relatively to the rigid frame.

The invention has for its object to provide a means for the indicated purpose, improved in various particulars, to the end that efficiency may be promoted, as well as economy of manufacture and convenience in effecting the assemblage and adjustment of the parts.

The invention resides in the novel features hereinafter more particularly described and claimed.

Reference is had to the accompanying drawings forming part of this specification, in which similar characters of reference indicate corresponding parts in all the views, and in which:

Figure 1 is a side elevation showing my invention applied to a motor cycle; Fig. 2 is a plan view of the invention applied to a motor cycle shown in part; Fig. 3 is an enlarged fragmentary side elevation; Fig. 4 is a cross-section on the line 4—4 Fig. 3; and Fig. 5 is a fragmentary side elevation showing a slight modification.

In carrying out my invention in accordance with the illustrated example, the motor cycle or like velocipede indicated by the letter A has rigid frame members, including upper rear stays B and lower rear stays B$^1$.

The letter C indicates the axle on the rear wheel D. A rigid frame element 10 is provided in fixed relation to the stays B, B$^1$, and in the example shown receives the rear ends of said stays. Associated with the rigid frame element 10 is a yielding frame element 11 provided with a rear fork 12 for receiving the axle C in the usual manner, and having set screws 13 to adjust the axle for tightening the motor driven chain F and the pedal chain E in machines employing the latter.

The yielding element 11 is so mounted as to have contact with the opposed face of the rigid element 10 and is adapted to rock on the surface of the latter in response to shocks and jars. The face 14 on the rigid chain element 10 and the opposite face 15 on the yielding element 11 are either or both rounding, the face 15 in the present example being shown as having a pronounced curvature and the face 14 having a slight curvature. The yielding element 11 is under the influence of a compression spring 16 which surrounds the free end of a rod 17, said rod being pivoted at its rear end as at 18 to the yielding frame element 11 near the lower end of the latter. The rod 17 extends through a depending arm 19 integral with the rigid frame element 10, said arm being formed with a vertical slot 20 to permit vertical vibrations of the rod. At its forward end the spring 16 abuts against a head 17$^a$ on the rod 17 and at its rear end said spring seats against a disk or collar 21 on the stem 17. The collar 21 is adapted to tilt on the arm 19 in response to the vibratory movements imparted to the rod 17, the collar being formed with notches 22 to receive V-shaped bearing ribs 23 on the arm 19.

By the described construction the yielding frame element 11 will be free to respond to vertical movements of the rear wheel D, and all shocks or jars received through the wheel D will be taken up by the compression spring 16. The rocking of the yielding element 11 over the relatively rigid element 10 tensions the spring 16 to an increasing degree as the upward rolling movement of said yielding element gives a gradually increased leverage.

In order to prevent displacement of the yielding element 11 in the direction in which it rocks, various means may be provided. In the form shown in Figs. 1 to 4 a link 26 is pivoted at its lower end as at 27 to the fixed frame element 10 and at its upper end as at 28 to the upper end of the yielding element 11. In the form shown in Fig. 5, instead of the link connecting the rigid and yielding elements, the said elements 10$^a$, 11$^a$ are provided with intermeshing rack teeth 14$^a$, 15$^a$ on the opposed surfaces. In both cases the up and down rolling movement of the yielding element 11 is permitted while said element is effectively restrained against displacement.

It will be understood that the described devices are duplicated at each end of the rear axle, as shown in Fig. 2.

In practice, I prefer to provide housing plates 29 at the joint between each rigid frame element 10 and rolling frame element 11. These plates may be secured by rivets or bolts 30 to the frame element 10 to overlap the adjacent element 11.

The reference character G represents a brake rod which connects with a band brake 33ª, by a bellcrank G¹, or other means.

Having thus described my invention, what I claim as new and desire to secure by Letters Patent, is:

1. In a velocipede, a rigid frame, and a spring frame element mounted adjacent to a member of the rigid frame and rockable over the opposed surface presented by said member, said rockable element being formed with a rear fork to receive a rear wheel.

2. In a velocipede, a rigid frame, a yielding frame element provided with a rear fork, and spring means acting on the yielding element, said yielding element lying against the rigid element and adapted to have rocking movement thereon against the tension of the spring.

3. In a velocipede, a rigid frame, a spring frame element mounted adjacent to the rigid frame, said spring frame element being rockable on the opposed surface of the rigid frame and being formed with a rear fork, and means for restraining the spring frame element against displacement in the direction of its rocking movement.

4. In a velocipede, a rigid frame formed with a depending arm, a yielding frame element having a rear fork and arranged to have rocking movement on the rigid frame, a rod pivotally connected at one end with the yielding frame element and extending through said arm, a compression spring surrounding the rod at the opposite side of the arm from the yielding element, and a seat on said rod against which the adjacent end of the spring abuts, said seat being adapted to have tilting movement on the said arm.

5. In a velocipede, a rigid frame formed with a depending arm, a yielding frame element having a rear fork and arranged to have rocking movement on the rigid frame, a rod pivotally connected at one end with the yielding frame element and extending through said arm for movement relatively to said arm, a compression spring surrounding the said rod at the opposite side of the arm from the yielding element and serving to resist movement of the yielding element, and means for restraining the yielding element against displacement in the direction of its rolling movement.

In testimony whereof I have signed my name to this specification in the presence of two subscribing witnesses.

CLARENCE D. COMPTON.

Witnesses:
THOMAS SMYTH,
GEORGE GLASS.